United States Patent [19]

Andrews et al.

[11] Patent Number: 5,477,323

[45] Date of Patent: Dec. 19, 1995

[54] FIBER OPTIC STRAIN SENSOR AND READ-OUT SYSTEM

[75] Inventors: Jeffrey P. Andrews, Abingdon; Joseph A. McClintock, Baltimore; Carl F. Guerci, Jr., Pasadena, all of Md.

[73] Assignee: Martin Marietta Corporation, Bethesda, Md.

[21] Appl. No.: 194,960

[22] Filed: Feb. 14, 1994

Related U.S. Application Data

[63] Continuation-in-part of Ser. No. 972,396, Nov. 6, 1992.

[51] Int. Cl.⁶ ........................................................ G01B 9/02
[52] U.S. Cl. .............................. 356/345; 356/352; 385/12
[58] Field of Search ................................ 356/345, 352; 385/12, 13, 14, 34

[56] References Cited

U.S. PATENT DOCUMENTS

| | | | |
|---|---|---|---|
| 4,873,989 | 10/1989 | Einzig | 356/352 |
| 4,881,813 | 11/1989 | Koo et al. | 250/227 |
| 4,924,477 | 5/1990 | Gilmore et al. | 374/55 |
| 4,948,254 | 8/1990 | Ishida | 356/358 |
| 4,974,961 | 12/1990 | Jackson et al. | 356/345 |
| 5,094,534 | 3/1992 | Cole et al. | 356/345 |
| 5,202,939 | 4/1993 | Belleville | 356/345 |
| 5,280,173 | 1/1994 | Morse et al. | 356/352 |

FOREIGN PATENT DOCUMENTS

| | | |
|---|---|---|
| 0501559 | 9/1992 | European Pat. Off. . |
| 3623265 | 1/1988 | Germany . |
| 2249232 | 4/1992 | United Kingdom . |

OTHER PUBLICATIONS

Joseph C. Palais, "Fiber Coupling Using Braided-Index Rod Lenses", Applied Optics, 15 Jun. 1980, vol. 19, No. 12 pp. 2011–2018.

Journal of Physics E: Scientific Instruments, vol. 18, No. 12, Dec. 1985, Bristol, GB, pp. 981–1001; D. A. Jackson: *Monomode optical fibre interferometers for precision measurement.*

Optic Letters, Feb. 5, 1991, vol. 16, No. 4, pp. 273–275, Kent A. Murphy et al.: *Quadrature phase-shifted, extrinsic Fabry-Perot optical fiber sensors.*

Applied Optics, vol. 29, No. 30, 20 Oct. 1990, pp. 4473–4480, Awad Samir Gerges et al.: *Coherence tuned fiber optic sensing system, with self-initialization, based on a multimode laser diode.*

Fiber Optic Sensor-Based Smart Materials and Structures Workshop, Blacksburg, Va., Apr. 15–16, 1992; Brian R. Fogg et al.: *Optical fiber sensor for absolute measurement.*

Proceedings of the ADPA/AIAA/ASME/SPIE Conference on Active Materials and Adaptive Structures, 4–8 Nov. 1991, Alexandria, Va.,; J. P. Andrews, pp. 661–665: *Hybrid fiber optic strain sensor resolves directional ambiguity of time multiplexed Fabry-Perot.*

Primary Examiner—Samuel A. Turner
Assistant Examiner—Robert Kim
Attorney, Agent, or Firm—Gay Chin; William H. Meise

[57] ABSTRACT

An optical sensor is described comprising a first optical fiber and a first reflective member. The first optical fiber has a first predetermined length of graded-index multimode optical fiber attached to its end. The first reflective member and the first optical fiber are arranged such that a gap is formed between the unattached end of the graded-index multimode optical fiber and the first reflective member. Also described is a rugged sensor design incorporating the first optical fiber and first reflective sensor as well as a method for providing the predetermined length of graded-index multimode fiber at the end of the first optical fiber. Finally, a readout system for an optical sensor is also described which comprises two optical paths differing in length by an amount equal to an optical path distance in the optical sensor. The readout system also comprises an optical source having a wavelength differing from that of the optical sensor, a modulator and a controller. The readout system provides a linear output signal that is independent of temperature and vibration effects associated with the read-out system.

27 Claims, 4 Drawing Sheets

FIBER OPTIC STRAIN SENSOR AND READ-OUT SYSTEM

This application is a continuation-in-part of Application Ser. No. 972,396, filed Nov. 6, 1992.

FIELD OF THE INVENTION

The present invention relates to sensitive, durable optical sensors that can be series multiplexed, and to methods for manufacturing such sensors. The present invention also relates to read-out systems that provide a linear output in response to a detected environmental parameter, while eliminating thermal and vibration effects.

BACKGROUND OF THE INVENTION

Optical sensors have often been used to measure quantities such as strain, temperature, pressure and displacement. Among the sensors used for this purpose are interferometric-type sensors that rely on beam-splitting techniques to make the desired measurement. These sensors operate on the principle of having one of the split beams (the sensing beam) interact with the environment and then recombining with the other split beam (the reference beam) that has remained isolated from the environment. The sensing beam is modulated as a function of the environment to be measured. The combined beams interfere with each other to produce a pattern that varies with the phase modulation induced by the environment interacting with the sensing beam. Interferometric optical sensors, or interferometers, take a variety of different forms, examples of which are illustrated in FIGS. 1–3.

FIG. 1 shows a Mach-Zehnder type interferometer. In this type of interferometer, a light beam is split and transmitted along two different paths, referred to here as reference leg 3 and sensing leg 4. The sensing leg 4 interacts with the environmental parameter to be measured while the reference leg 3 remains isolated from the environmental parameter. The two beams are then recombined to interfere in an amount dependent upon the phase change induced in the sensing leg 4.

For example, if an optical fiber constituting the sensing leg 4 is bonded to a structure such that strain in the structure causes a corresponding elongation of the optical fiber, the change in the path length will result in a change in the relative phase of the beams traversing the reference leg 3 and sensing leg 4. The relative phase change will yield a change in the output intensity due to the interference of the two beams when they recombine. For a given elongation, the two beams will interfere constructively, resulting in a maximum output intensity. Further elongation of the sensing leg 4 causes the two beams to interfere destructively, resulting in a minimum output intensity. The intensity of the output will thus oscillate between a maximum and minimum value as the length of the sensing leg 4 is varied, forming a fringe pattern. Accordingly, there is a sinusoidal relationship between strain and output intensity.

FIG. 2 shows a Michelson type interferometer. This interferometer works on the same principle as the Mach-Zehnder type interferometer except that in this case the light beams are reflected back from each end of the respective legs 3,4 to be recombined in the same region where the light beam is split, i.e., at the end of the legs 3,4 nearest the light source.

A third known interferometer design is the Fabry-Perot type interferometer shown in FIG. 3. In this design, the sensing and reference legs are co-linear. Two or more reflections are created by in-line partial reflectors. As indicated in FIG. 3, the first reflection 1 occurs at the reflector nearest the light source and the second reflection 2 occurs at the reflector farthest from the light source. The reflectors may be formed by interfaces defined by a gap, or cavity, in the optical path, in which case the interferometer is called an extrinsic Fabry-Perot type interferometer. Here, the first reflection 1 acts as the reference beam and the second reflection 2 acts as the sensing beam. Accordingly, the distances travelled by the reference and sensing beams differ by an amount equal to the round trip distance through the gap. Therefore, a change in the gap length causes fringes to appear at the output.

Extrinsic Fabry-Perot type interferometers are commonly used to measure quantities such as strain, temperature, pressure, and displacement. Such interferometers are advantageous in embedded sensing applications for a number of reasons. For example, extrinsic Fabry-Perot type interferometers offer high sensitivities typical of interferometers while at the same time overcoming many of the common drawbacks associated with interferometers. In particular, extrinsic Fabry-Perot type interferometers are insensitive to polarization and have good thermal stability. The thermal drift associated with these interferometers is expected to be about 0.0002 fringes per 100° C.

Other optical sensors are known which are hybrid sensors based on a combination of two or more optical sensors. For example, a hybrid sensor featuring a Fabry-Perot optical sensor and an intensity-based sensor is described in commonly assigned Ser. No. 07/972,393, the disclosure of which is incorporated herein by reference.

In some technical applications, it is desirable to series multiplex several Fabry-Perot type optical sensors. Unfortunately, optical losses associated with traditional Fabry-Perot type optical sensors severely hamper their ability to be multiplexed in this fashion. Moreover, typical Fabry-Perot type optical sensor designs are also quite fragile. Accordingly, there is a need for a Fabry-Perot optical sensor having a rugged design and for a Fabry-Perot optical sensor which will minimize the losses that occur when such optical sensors are series multiplexed.

Other applications require an optical sensor design exhibiting a wide dynamic range and providing an output signal that is linear with respect to a detected environmental parameter, while at the same exhibiting low sensitivity to temperature and/or vibration. Unfortunately, many fiber-optic-based systems, while having a wide dynamic range, have sinusoidal, rather than linear output signals, and many of these systems are sensitive to temperature and vibration. Thus, there is a need for an optical sensor system having a combination of wide dynamic range, linear output and low temperature and vibration sensitivity.

SUMMARY OF THE INVENTION

The present invention provides an optical sensor and a read-out system that overcome the deficiencies noted above. According to an embodiment of the invention, an optical sensor comprising a first optical fiber and a first reflective member is provided. The first optical fiber has a first predetermined length of graded-index multimode optical fiber attached to its end. The first reflective member and the first optical fiber are arranged such that a gap is formed between the unattached end of the graded-index multimode optical fiber and the first reflective member. The first reflective member can comprise, for example, a mirrored surface, or can comprise a second unattached end of a second predetermined length of graded-index multimode optical fiber that is attached to an end of a second optical fiber. Among other advantages, this arrangement allows the optical sensor to be series multiplexed with an additional optical sensor. For example, a third optical fiber having a third predetermined length of graded-index multimode optical fiber attached to an end thereof can be optically coupled with the second optical fiber, and a second reflective member can be provided such that the second reflective member and the third optical fiber are arranged to form a gap between the second reflective member and an unattached end of the third predetermined length of graded-index multimode optical fiber.

Some advantages of the above optical sensor are that it is highly sensitive, and that it can be multiplexed to reduce the costs of optical sensor systems.

According to another embodiment of the invention, an optical sensor is provided which comprises a first optical fiber, a second optical fiber, an alignment sleeve and a sealant. The first and second optical fibers are disposed in the alignment sleeve such that a gap of predetermined length is formed between the ends of the first and second optical fibers. The sealant surrounds a portion of the first and second optical fibers where the first and second optical fibers enter said alignment sleeve such that the sealant seals the alignment sleeve and provides a continuous transition between an outer dimension of the alignment sleeve and the outer dimensions of the first and second optical fibers. If desired, a coating layer can be provided to cover the alignment sleeve, the sealant and portions of the first and second optical fibers adjacent to the sealant.

Some advantages of the above optical sensor are that it can be quickly and easily manufactured from commercially available materials, it is durable, and it is shelf stable.

According to another embodiment of the invention, a method for providing a multimode collimating lens on the end of a single mode fiber is described. Initially, a first high quality cleave (break) is established at a first end of a predetermined length of single mode fiber, and the reflected power associated with the first high quality cleave is measured. A second high quality cleave is also established at a first end of a predetermined length of multi-mode fiber. Then, the first high quality cleave is attached to the second high quality cleave (e.g. by forming a fusion splice). A region surrounding the fusion splice is subsequently illuminated to reveal a precise location of the fusion splice, and a third high quality cleave is established at a second end of the multimode fiber at a predetermined distance from the fusion splice. Finally, the reflected power associated with the third high quality cleave is measured.

An advantage of this method is the ease with which a multimode collimating lens can be accurately established on the end of a single mode fiber.

According to another embodiment of the invention, an optical sensor with read-out system is described. The optical sensor comprises first and second optical paths differing in length by a predetermined distance. The optical sensor provides an optical signal output at a first wavelength responsive to an environment sensed by the optical sensor. The readout-system comprises an optical source, third and fourth optical paths, a modulator and a controller. The optical source generates an optical source output at a second wavelength differing from the first wavelength. The third and fourth optical paths differing in length by a distance substantially equal to the difference in path length between the first and second optical paths. The optical signal output and the optical source output are coupled to the third and fourth optical paths such that a first portion of the optical signal output and a first portion of the optical source output comprise a first optical beam traversing the third optical path and such that a second portion of the optical signal output and a second portion of the optical source output comprise a second optical beam traversing the fourth optical path. The modulator is provided to modulate the phase of at least one of the first and second optical beams. Finally, the controller is provided to sense a first change in phase relationship between the first and second optical beams at the first wavelength, to sense a second change in phase relationship between the first and second optical beams at the second wavelength, and to provide a signal to the modulator based on a difference between the first and second changes in phase relationship, returning the phase relationship between the first and second optical beams to a predetermined phase relationship independent of temperature and vibration effects in the read-out system.

The optical source and optical sensor each includes a light source such as a light emitting mode or a laser. The optical source preferably includes a 1.55 µm laser and the optical sensor preferably includes a 1.3 µm light emitting diode. The optical sensor can comprise, for example, a Mach-Zehnder type interferometer, a Fabry-Perot type interferometer, or a Michelson type interferometer.

If desired, the first optical path can comprise an optical fiber, and the modulator can comprise a cylindrical piezo-electric element that varies in diameter as a function of said signal from said controller, with the optical fiber being wrapped around the cylindrical piezo-electric element such that the optical fiber changes in length as the cylindrical piezo-electric element varies in diameter.

Advantages of the read-out system of the present invention are that it creates a linear, single-valued output from optical sensors normally producing a sinusoidal signal. The output signal is also insensitive to temperature and vibration, and has a wide dynamic range.

DETAILED DESCRIPTION

Figure 4:
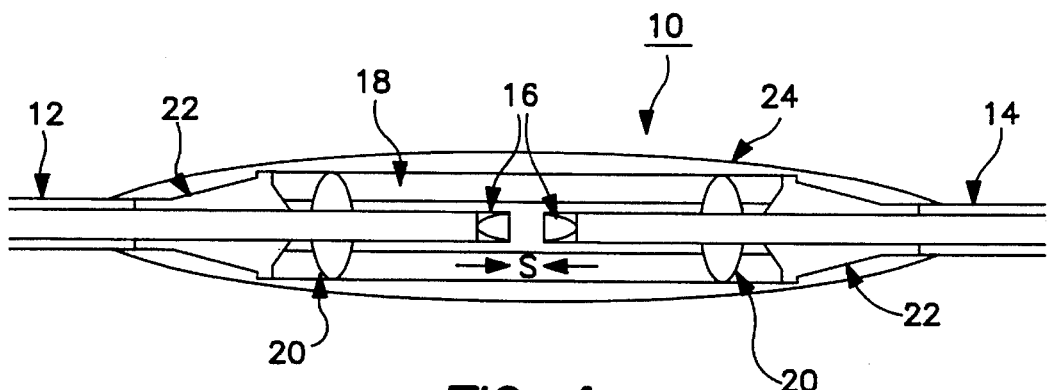
FIG. 4 illustrates an optical sensor according to an embodiment of the present invention.

FIG. 4 illustrates an optical sensor 10 in the form of an extrinsic Fabry-Perot type interferometer according to an embodiment of the present invention. The optical sensor 10 of the present invention comprises lead-in 12 and lead-out 14 optical fibers. In FIG. 4, the lead-in 12 and lead-out 14 optical fibers are each provided with an optional fiber microlens 16. The lead-in 12 and lead-out 14 fibers in FIG. 4 are held in a predetermined position by means of an alignment member 18.

As seen in FIG. 4, the lead-in 12 and lead-out 14 fibers are arranged in the alignment member 18 such that an air gap of length S is formed between the unattached ends of the microlenses 16. The air gap length S ranges from 10 to 600 μm.

The lead-in 12 and lead-out 14 fibers and microlenses 16 preferably have maximum outer dimensions that are only slightly smaller than the minimum inner dimensions of the alignment member 18. Both the maximum outer dimensions and the minimum inner dimensions preferably range from about 70 to 250 μm.

The alignment member 18 can comprise, for example, a hollow tubing member. A preferred alignment member for the practice of the present invention is a silica capillary tube that is drawn from a preform using the same techniques as those used in optical fiber manufacturing. Other tubing materials such as metals or plastics may be more appropriate where high strain levels (e.g., >3%) are measured.

Several methods can be used to hold the lead-in 12 and lead-out 14 fibers in place within the alignment member 18. For example, the lead-in 12 and lead-out 14 fibers can be held in place by mechanical means such as friction, by adhesives, and/or by fusion welds. The preferred method for holding the lead-in 12 and lead-out 14 fibers in place is by means of fusion welds 20, as shown in FIG. 4. This particular technique makes fabrication of the optical sensor 10 easier and faster than many other techniques. The fusion welds 20 are formed, for example, using an arc fusion splicer. Other techniques, such as gluing the fibers in place, typically require that the manufacturer wait until the glue sets before moving the device to ensure that the initial air gap does not change. This can significantly slow down the manufacturing process making the sensors more expensive. Nonetheless, fast-curing epoxies (such as Devcon 5 Minute Epoxy) or adhesives that cure quickly when exposed to ultra-violet light (such as Norland 61) may be useful in some applications, and may be utilized to manufacture the apparatus of the present invention.

The lead-in 12 and lead-out 14 fibers are also optionally provided with a coating of sealant, which is preferably an adhesive 22, at the point where the leadin 12 and lead-out 14 fibers enter the ends of the alignment member 18. Useful high temperature, high viscosity adhesives 22 include Dexter Aerospace Hysol EA9394, Hysol EA9395, Hysol EA9369, Master Bond Supreme 11HT3, Master Bond EP65HT-1, EPO TECH 354T. "High temperature adhesives" as used herein means those adhesives able to function at temperatures above 300° F.

The adhesive 22 preferably satisfies several requirements. First, it is desirable that the adhesive 22 act as a strain relief on the fusion weld 20. Moreover, the adhesive 22 preferably acts as a transition zone between the larger outer dimension of the alignment member 18 and the smaller outer dimension of the lead-in 12 and lead-out 14 fibers. This reduces the strain gradient surrounding the optical sensor 10 if it is embedded into a composite, thus reducing the optical sensor's impact on the structural integrity of the composite. Finally, the adhesive 22 preferably acts to block the ends of the alignment member 18, so the subsequently applied coating material 24 does not enter the optical sensor 10 by capillary action before or during the curing of the coating material 24. The preferred adhesive 22 meeting the above requirements is a high temperature adhesive such as Dexter Hysol EA9395.

The alignment member 18, the adhesive 22, and portions of the lead-in 12 and lead-out 14 fibers are then provided with an optional coating material 24. The coating material 24 preferably protects the optical sensor 10 from water vapor, thus to extending the shelf life of the optical sensor 10. Moreover, if the optical sensor 10 is to be embedded into a material that is exposed to high temperatures during curing (e.g., a composite material) or if it is exposed to high temperatures during service conditions, it is desirable that the coating material maintain its integrity under those temperatures. The coating material 24 meeting these preferred criteria is a polyimide coating such as Dupont Pyralin LX or EPO TECH 391.

The fiber microlens 16 is optionally provided to improve the focusing and collimating properties of the light entering the lead-out fiber 14 or leaving the lead-in fiber 12. Other types of lenses are available, including graded-index rod lenses, but these lenses are less preferred because they have diameters that are typically too large for the present application. These lenses are also difficult to align and are glued, rather than fused, to the fibers, providing a structure that is temperature sensitive and prone to mechanical damage.

The microlenses 16 of the present invention are constructed by fusing a short section of graded-index optical fiber to the ends of the lead-in 12 and lead-out 14 fibers to provide microlenses 16. When used in connection with microlenses 16, the lead-in 12 and lead-out 14 fibers are preferably single-mode fibers. The microlenses 16 are rugged and compact, and they are easily aligned, fused and cleaved as discussed below. The specific length of the graded-index fiber segment necessary to provide the required focusing properties of the microlens 16 will depend on the index gradient of the graded-index fiber segment. The specific length of the graded-index fiber segment is preferably selected such that the graded-index fiber segment acts as a quarter-pitch graded-index rod lens, thereby collimating light as it exits the lead-in fiber 12. One pitch is defined as the length of a graded-index rod lens needed for light of a certain wavelength to execute one cycle, or sine wave. The actual lens length, Z, is calculated from both the pitch, p, and from the measured value of the index gradient constant, A, using the following formula:

$$Z = \frac{2\pi P}{\sqrt{A}}.$$

For typical applications of the present invention, the length Z of the graded-index fiber lens segment is preferably between 0.1 and 10 mm in length, more preferably between 0.2 and 0.4 mm.

By collimating the light that exits the lead-in fiber 12 by means of the microlens 16, less light is lost across the air gap. Accordingly, the intensity of the optical sensor's second reflection is increased. This increase in reflected light increases the signal level and thus increases the optical sensor's sensitivity.

If sensor multiplexing is desired, an identical microlens 16 is preferably used to launch the unreflected light into the lead-out fiber 14 for delivery to the next optical sensor (not shown). The optical loss of this device is on the order of 1 dB as compared to 13 dB for current devices. This can be done repeatedly to series multiplex several optical sensors along the same optical path. Many multiplexing techniques are possible including coherence, time domain, wavelength division, FM continuous wave and so forth.

The fiber microlenses 16 may be provided as follows. First, a section of multimode optical fiber and a section of either of the lead-in 12 or lead-out 14 fibers are stripped of their outer protective coatings and cleaved. The two stripped ends are then fused using, for example, a fusion splicing machine such as those provided by Fujikura (Alcoa Fujikura Ltd.; 150 Ridgeview Circle; Duncan, SC 29336) which automatically aligns the two stripped ends before fusing. The outside diameters of the two stripped ends should be sufficiently similar to allow the formation of a fusion splice.

The fused section of fiber is then cleaved at the proper place using, for example, a cleaving machine such as those provided by York (York Technology Inc.; Subsidiary of York Technology Ltd.; 127 Wall Street; Research Park; Princeton, N.J. 08540-1521). Once placed in the cleaving machine, the fused section is illuminated with white light and observed through a microscope. In this way, the location of the fused region can be seen and the fiber can be moved in the cleaver and cleaved to obtain the required length for the multimode fiber section. Once cleaved, the non-fused end of the multimode fiber may be polished or angle cleaved to reduce back reflection, or it may be provided with reflective, antireflective or wavelength-selective optical coatings, or it may be heat treated, to further increase sensitivity or to provide for wavelength division multiplexing.

Figure 9:
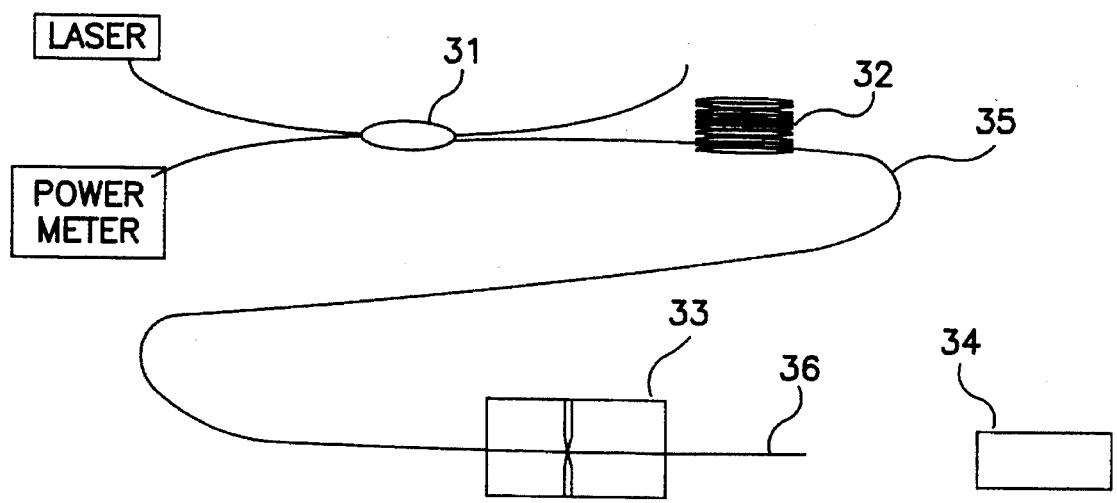
FIG. 9 schematically illustrates an apparatus for forming a microlens according to an embodiment of the present invention.

A preferred set-up for performing the above operation will now be discussed in connection with FIG. 9. As seen in FIG. 9, the apparatus includes a laser, a 50/50 coupler 31, a power meter, a fusion splicer 33, and a cleaver 34. The laser and power meter are optically connected into the input of the coupler 31. A spool 32 of single mode fiber 35 is connected to one of the output legs of the coupler 31.

A preferred procedure for using the apparatus of FIG. 9 is described as follows. At the beginning of a lensmaking session, several (e.g., five to ten) practice cleaves should be performed on the single mode fiber 35. By making several practice cleaves and recording the reflected power after each cleave, the operator can determine what amount of reflected power indicates a high quality cleave. Ideally, 4% of the transmitted power should be reflected from the end of a fiber having a high quality cleave. However, in the apparatus shown in FIG. 9, the reflected power measured by the power meter will be less than 4% of the power transmitted by the laser. The reflected power is less than 4% of the transmitted power because of the additional attenuation associated with the 50/50 splitter 31 and any fiber connections along the path of travel of the light from the laser. Therefore, for a given apparatus, the actual transmitted power associated with the high quality cleave is somewhat uncertain. Nonetheless, by performing several practice cleaves, an operator can obtain a reliable reference value for a high quality cleave which accounts for the above loss mechanisms.

After the above calibration process, a high quality cleave is established on the end of the single mode fiber 35 and the reflected power value recorded using the power meter. Then, a graded index multimode fiber 36 is carefully cleaved. If desired, the multimode fiber 36 can also be cleaved as above. After the single mode fiber 35 and multi-mode fiber 36 have been cleaved, the two fibers 35, 36 are installed in the fusion splicer 33, where they are spliced together.

The fused fibers are then positioned on the York cleaver 34 where they are observed under a microscope. Using a graticule mounted in the eyepiece of the microscope, the multimode fiber can be cleaved at the proper distance from the fuse. It is this length that determines the pitch of the microlens. The York cleaver 34 is particularly suited to this task because its design allows the fiber to be observed while it is cleaved. Using the above formula, one can calculate that a quarter pitch lens using standard graded-index fiber has a length of approximately 200 microns based on the index gradient constant A and the pitch P. By maneuvering an external light source (such as a "gooseneck" desk lamp) to illuminate the fiber from different angles, a dark line associated with the fusion splice can be seen. Then, using the graticule, the multi-mode fiber 36 can be cleaved at a quarter pitch length from the fusion splice.

Immediately after making the above cleave to the multi-mode fiber 36, the optical power meter will indicate the reflected power from the lens end face. This number is an indication both of the accuracy of the lens length and the cleave quality. If the lens is properly made, the new reflected power value will be nearly equal to the initial value measured above. If the reflected power is substantially lower than that measured above, the lens should be discarded.

By the above method, lenses can be quickly and efficiently constructed. Moreover, due to active monitoring during the process, all lenses produced by the above process are already performance tested.

As noted above, the optical sensor 10 of FIG. 4 operates using optical interference to measure phase changes arising from changes associated with the air gap. According to an embodiment of the invention, a CW laser is used as an optical source for use with the optical sensor 10 of the present invention. Upon reaching the air gap, a first Fresnel reflection is created at the air/glass interface of the microlens 16 at the end of the lead-in 12 fiber. A second Fresnel reflection, which is created at the air-glass interface of the microlens 16 at the end of the lead-out 14 fiber, traverses back across the air gap length S and is recaptured by the microlens 16 of the lead-in 12 fiber. If a CW laser with a relatively long coherence length (e.g., >200 µm in air) is used, these two reflections will interfere with one another and go through constructive and destructive interference fringes, for example, as the gap length S changes by multiples of ¼ wavelength. Therefore, when the gap length S is equal to an integral number of half wavelengths, the two reflections add constructively, creating a maximum detector voltage. When the gap length is equal to an odd number of quarter wavelengths, the two reflections interfere destructively, creating a low detector voltage. Thus, if the optical sensor 10 depicted in FIG. 4 is attached to a CW laser source, then a linearly increasing strain, for example, will induce a linearly increasing gap length S, resulting in a sinusoidal response. There are different techniques which can be used to analyze such strain information from the optical sensor 10, and a read-out system is discussed below for this purpose, but the basic sensor operation is the same in all cases.

An optical sensor 10 has been described above which can be quickly and easily manufactured using commercially available materials and is capable of accurately measuring, for example, strain and vibration when embedded in or attached to a structure.

In summary, the optical sensor 10 described above in connection with FIG. 4 has a reduced impact on structural integrity. For example, when embedding sensors into a composite material, there is always a concern that the sensor will act as a "flaw" in the material and will therefore reduce the strength of the structure. However, the addition of adhesive 22 at the ends of the device reduces the local strain gradient surrounding the embedded sensor 10 and thus reduces the sensor's impact on structural integrity.

Moreover, the sensor 10 is very rugged as compared with other known fiber-optic-based optical sensors, which are typically sufficiently fragile that simple handling can cause them to break. This problem is particularly troubling when the sensor is to be embedded in a composite material.

In addition, previous sensors are degraded by exposure to air and therefore have a shelf life limited to only a few days. The present sensor, however, has an indefinite shelf life because it is sealed from air and moisture.

Finally, due to the micro lenses 16, the sensor is highly sensitive, and it is thus possible to series multiplex many sensors along a single length of fiber. The microlenses 16 are very simple and inexpensive to manufacture and have no impact on sensor dimensions. This significantly improves the cost effectiveness of sensor systems and makes possible many new sensor applications that would otherwise be impractical.

As previously noted, optical sensor designs often have outputs that are sinusoidal with respect to the environmental parameter being measured. It is desirable, however, to provide an output signal that is directly related to the environmental parameter measured. Several systems are known for this purpose. For example, a wavelength tuning system is described in commonly assigned Ser. No. 07/972,397, and phase-compensating read-out system is described in commonly assigned Ser. No. 07/972,396, the disclosures of which are incorporated herein by reference. The above wavelength tuning system uses a tunable light source to generate light of two different wavelengths which allows a gap length, such as that associated with a Fabry-Perot optical sensor, to be directly determined. The above phase-compensating read-out system provides an output signal that is linear with respect to the parameter to be sensed.

Figure 1:
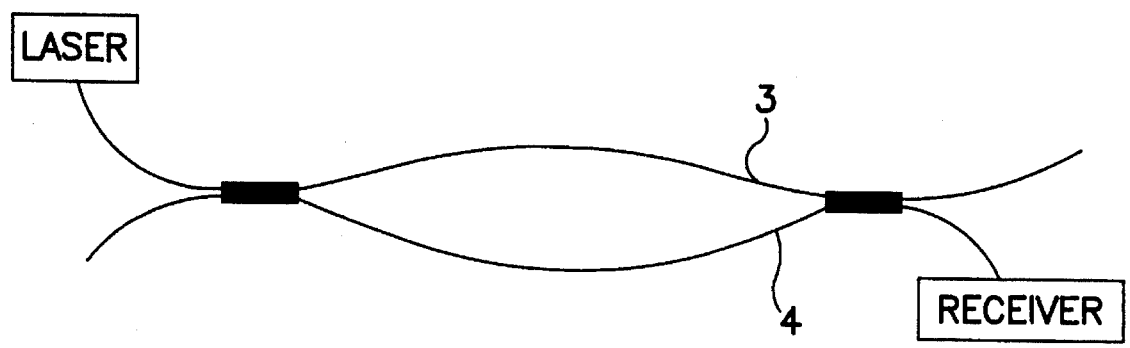
FIG. 1 schematically illustrates a Mach-Zehnder type interferometer.
Figure 2:
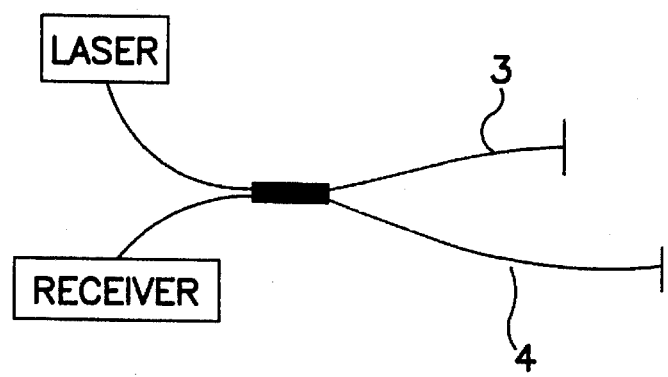
FIG. 2 schematically illustrates a Michelson type interferometer.
Figure 3:
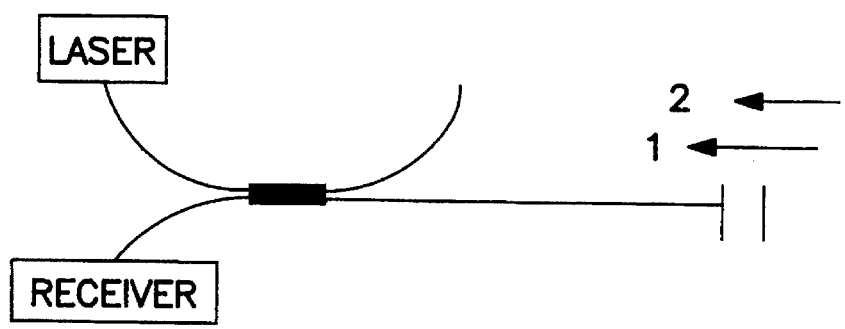
FIG. 3 schematically illustrates a Fabry-Perot type interferometer.
Figure 5:
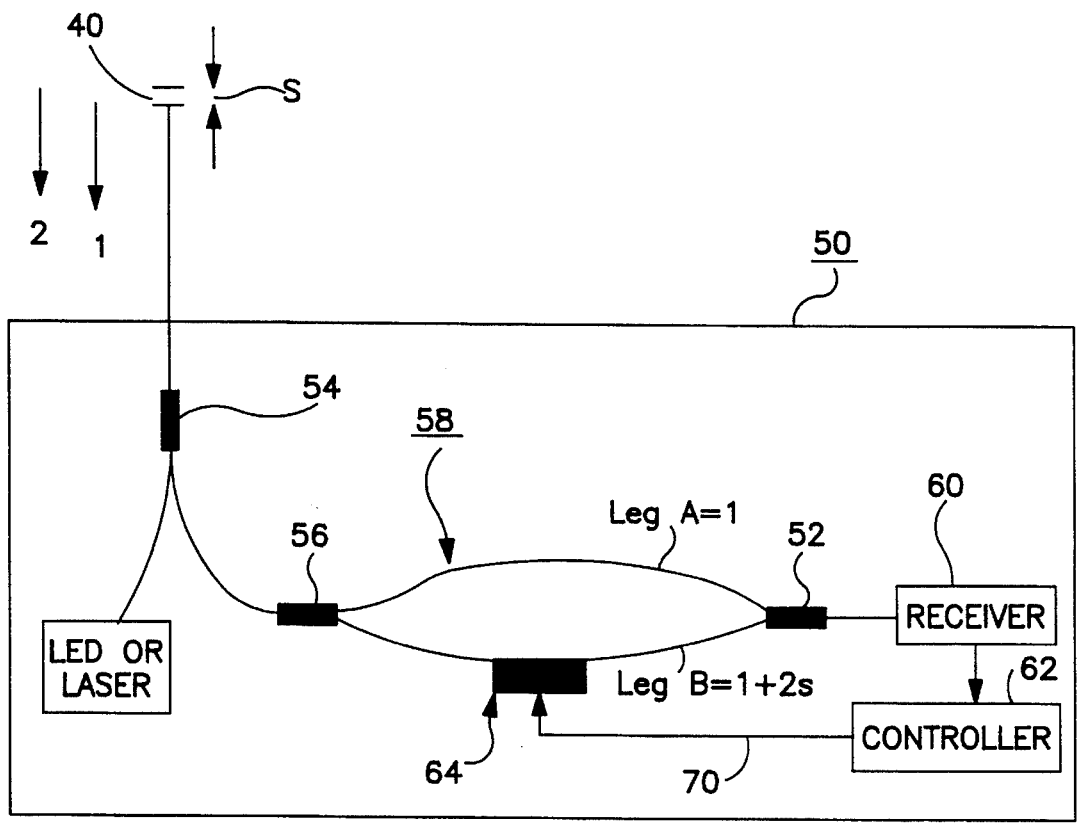
FIG. 5 schematically illustrates an optical sensor in connection with a phase compensating read-out system constructed according to the principles of the present invention.

FIG. 5 illustrates a phase-compensating read-out system 50 that is used in accordance with an embodiment of the present invention. For the purposes of illustration, the system is shown in conjunction with a specific optical sensor, i.e., a Fabry-Perot type interferometer 40. It should be noted, however, that the phase compensation system of the present invention may be used with a variety of other optical sensors, including those shown in FIGS. 1 and 2.

One significant aspect of the operation of the Fabry-Perot type interferometer 40 is the relationship between the light beam source and the gap length S of the cavity. In the present embodiment, the gap length S of the cavity is preferably of a length such that the round trip distance through the cavity is greater than the coherence length of the light source so that no interference is created at the output of the sensor. Preferred light beam sources include light emitting diodes (LEDs) and laser diodes. Light emitting diodes are generally advantageous because they have a short coherence length of approximately 20 μm.

A coupler 54 connects the light beam source to the Fabry-Perot type interferometer 40 and also connects the optical output of the Fabry-Perot type interferometer 40 to an input coupler 56 or beam-splitter of the phase compensating system 50. As shown in FIG. 5, the phase compensating system 50 can comprise, for example, a Mach-Zehnder type interferometer 58 in which the optical path length of the two legs A and B differ. The coupler 54 directs the reflected beams 1 and 2 from the Fabry-Perot type interferometer 40 to the coupler 56, which then splits the recombined beam so that it traverses legs A and B of the Mach-Zehnder type interferometer 58. For reasons to be explained below, the difference in optical path length between the two legs A and B of the Mach-Zehnder type interferometer 58 embodiment of FIG. 5 is approximately equal to the round trip distance 2S traversed by the sensing beam in the cavity of the Fabry-Perot type interferometer 40.

As will become more apparent below, other arrangements such as a Fabry-Perot type interferometer or a Michelson type interferometer can be used, because they have two optical paths that can differ in length by a distance 2S, one of which paths can be separately modulated.

Moreover, although the phase compensating Mach-Zehnder type interferometer 58 and the Fabry-Perot type interferometer 40 employed in this embodiment of the invention are constructed from fiber optics, bulk optics and integrated optical designs may be used instead.

If desired, the two fiber couplers 56 and 52 can be fused together so that the legs A and B are very nearly the same length. Then, two gradient index (GRIN) lenses (not shown) can be mounted in one of the legs A or B so that the path difference between the two interferometer legs A and B can be adjusted with great precision. Of course, other types of collimators may also be employed besides GRIN lenses. For example, microlenses comprising lengths of gradient index optical fiber as described above in connection with FIG. 4 can be used for this purpose.

The output signal from the Mach-Zehnder type interferometer 58 is detected, for example, by a receiver system 60.

Figure 6:
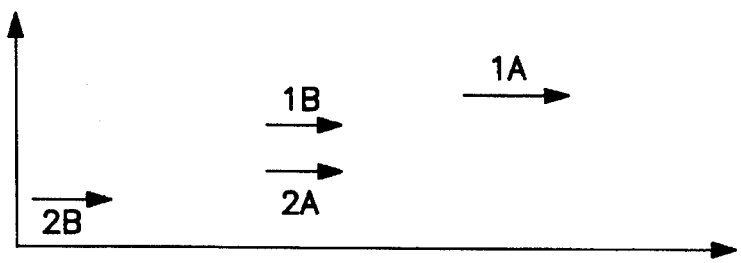
FIG. 6 graphically illustrates the arrival times of the two optical beams from an optical sensor after being split and recombined in a read-out system employed according to an embodiment of the present invention.

The reasons for employing an arrangement having two optical paths of different lengths, such as the unbalanced Mach-Zehnder type interferometer 58, is explained with reference to FIGS. 5 and 6. Assuming leg A is shorter than leg B, a light beam starting at coupler 56 and traversing leg A will reach the detector 60 before a light beam traversing leg B. The reflected beam 1 is defined as the beam reflected from the end of the lead-in fiber of the Fabry-Perot type interferometer 40. In other words, the reflected beam 1 is the beam that does not traverse the gap. The reflected beam 2 is defined as the beam reflected from the end of the lead-out fiber of the Fabry-Perot type interferometer 40. In other words, the reflected beam 2 is the beam that does traverse the gap. Accordingly, beam 2 travels a distance that is 2S longer than beam 1 within the Fabry-Perot type interferometer 40. Beam 1 thus arrives at the coupler 56 before beam 2, since its travel distance is less. Moreover, the portion of beam 1 traversing leg A (beam 1A) will arrive at detector 60 before the portion of beam 1 traversing leg B (beam 1B) since leg A is shorter than leg B. Similarly, the portion of beam 2 traversing leg A (beam 2A) will arrive at detector 60 before beam 2B. The final beam to arrive at detector 60 will be the portion of beam 2 traversing leg B (beam 2B).

As mentioned above, leg A is shorter than leg B by a distance approximately equal to 2S, which is the round trip distance traversed by the reflected beam 2 in the gap of the Fabry-Perot type interferometer 40. Consequently, beams 1B and 2A will arrive at the detector at the same time since they both travel the same total distance from the LED or laser light source of the Fabry-Perot type interferometer 40 to the receiver 60. Thus, the order of arrival of the beams at the receiver 60 is as follows: 1A, 1B/2A, 2B. This temporal relationship is graphically illustrated in FIG. 6. Since the two beams 1B and 2A have travelled the same distance, they are coherent and will interfere with each other at the receiver 60. Reflections 1A and 2B are not coherent, due to the optical source used in this embodiment, and will appear at the receiver 60 as continuous-wave light (i.e., constant intensity light) which would be manifested as a DC offset voltage from the receiver.

As described to this point, the addition of the Mach-Zehnder type interferometer 58 to the Fabry-Perot type interferometer 40 in FIG. 5 has not improved the signal from the Fabry-Perot type interferometer 40. That is, the signal at the output of the Mach-Zehnder type interferometer 58 still comprises a sinusoidal output signal with respect to changes in the gap length. To linearize this output signal, a feedback loop is preferably added to the Mach-Zehnder type interferometer 58.

As shown in FIG. 5, a modulator 64 is provided in Leg B of the Mach-Zehnder type interferometer 58. A feedback loop 70 is provided between the receiver 60 and the modulator 64. Although not shown in FIG. 5, phase modulators 64 can be disposed in each leg of the Mach-Zehnder type interferometer 58, with the feedback loops providing feedback to each phase modulator 64. A controller 62 is provided in the feedback loop 70 to apply a signal to the modulator 64 whenever the intensity of the interfering beams 1B and 2A varies due to a change in gap length S. By applying a signal to the modulator 64, the controller maintains the intensity of the interfering beams 1B and 2A at a preselected value. The greater the change in gap length S, the greater the signal applied to the modulator 64 by the controller 62 to maintain the intensity of the beams.

The preferred phase modulator for the practice of the present invention is piezo-electric device, but the phase modulator employed may be formed from any type of phase modulator used for modulating optical beams, such as integrated-optic phase modulators and bulk-optic phase modulators. The preferred piezo-electric device employed is a piezo-electric cylinder 64 around which is wrapped one leg of the Mach-Zehnder type interferometer 58. Because the cylinder 64 is formed from a piezo-electric material, its diameter is a function of the applied voltage. Accordingly, as voltage is applied to the cylinder the cylinder expands, stretching the fiber forming leg A and thus inducing phase modulation.

The controller employed in the feedback loop 70 need not be limited to any particular type of controller. However, the controller is preferably designed so that it can adjust a phase compensation voltage provided to the phase modulator 64 over a time period no greater than that over which the gap lengths changes. More preferably, the voltage should be able to respond at a much faster rate than any change in the length of the gap S. If this condition is met, the voltage supplied to the phase modulator 64 is, in effect, directly proportional to the gap length S. A linear correlation between sensor phase (gap length) and output voltage is thus obtained by monitoring the voltage applied by the controller.

Figure 7:
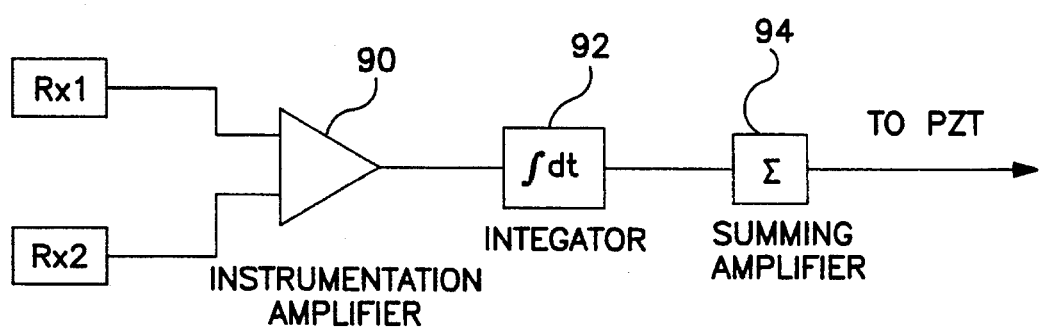
FIG. 7 is a schematic block diagram of the controller circuitry used to form an integrator feedback loop employed by a phase compensating read-out system according to an embodiment of the present invention.

An embodiment of the controller circuitry that may be used in the feedback loop 70 is illustrated in the block diagram of FIG. 7. Because the two output signals from the Mach-Zehnder type interferometer are 180 degrees out of phase, one of the inputs to the controller circuitry is inverted before the signals are summed. This inversion of one input is advantageous because the DC component of the output signal is canceled by the summer. Accordingly, common mode noise is rejected, producing a higher signal to noise ratio and increased gap length resolution. In addition, changes in intensity due to changing loss in the lead fiber connecting coupler 54 to the sensor do not effect the output signal.

It should be noted the embodiment of FIG. 5, while having a wide dynamic range associated with fiber-optic devices, is also sensitive to temperature and vibration. In other words, any phase changes occurring in response to temperature changes and vibration associated with the read-out system will also be canceled by the feedback loop and will thus be misinterpreted as a signal from the sensor.

Figure 8:
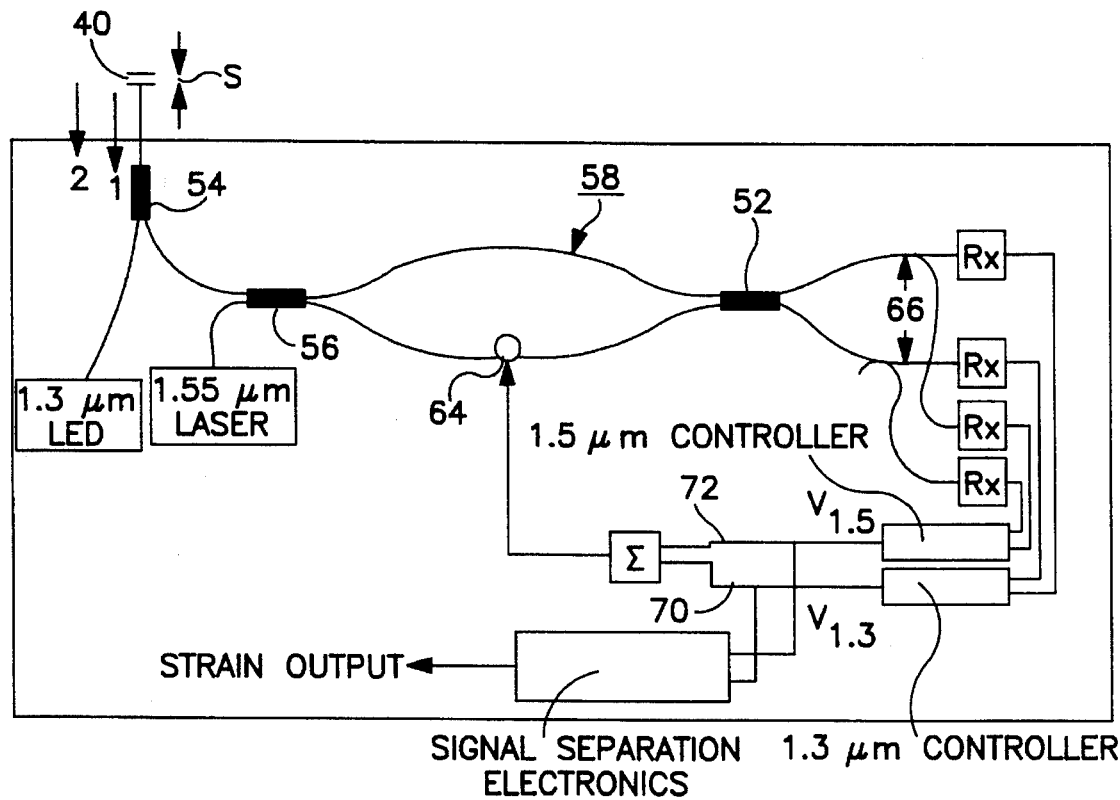
FIG. 8 schematically illustrates an embodiment of the phase-compensating read-out system of the present invention used in connection with a Fabry-Perot type optical sensor.

Accordingly, an embodiment of the phase-compensating read-out system shown in FIG. 8 has been designed for systems that are subject to significant vibration or thermal changes. FIG. 8 is similar to FIG. 5, except that a second wavelength of light and a second control loop are provided for active cancellation of thermal and vibration effects.

Referring now to FIG. 8, light is injected into the phase-compensating read-out system 50 by connecting a second light source to the unused input leg of the coupler 56. This light is of a second wavelength that is different from a first wavelength associated with the light injected into the Fabry-Perot type interferometer 40. The second light source must have sufficient coherence to create an interference at the output coupler 52, even though the interferometer portion 58 is unbalanced. In this embodiment, the first wavelength light is generated by a 1.3 μm LED and the second wavelength light is generated by a 1.55 μm laser.

Each of the output legs of coupler 52 are equipped with wavelength division decouplers 66 to isolate the second wavelength light, which is then used to drive a secondary control loop 72. The first wavelength light is used to drive the primary control loop 70. The control signals from the two control loops 70 and 72 are then summed electrically to drive the PZT cylinder 64. when both control loops 70 and 72 are engaged, the output of control loop 70 has components from the sensor 40, from thermal and vibration noise and from the control signal in loop 72. At the same time, the output of control loop 72 has components from thermal and vibration noise and from the control signal in loop 70. If amplifier gains are set appropriately, then the difference between the output of loop 70 and the output of loop 72 corresponds to the sensor signal only. Thus, the effect of vibrations and variations in temperature can be effectively eliminated from the output from sensor 40.

FIG. 7 depicts a schematic block diagram of the controller circuitry used to form an integrator feedback loop employed by a phase compensating read-out system according to an embodiment of the present invention. As shown in FIG. 7, the controller circuitry comprises an instrumentation amplifier, 90, and integrator, 92, and a summing amplifier, 94.

The above is a detailed description of particular embodiments of the invention. The full scope of the invention is set forth in the claims that follow and their equivalents. Accordingly, the claims and specification should not be construed to unduly narrow the full scope of protection to which the invention is entitled.

What is claimed is:

1. An optical sensor, comprising:

a first single mode optical fiber having a predetermined length of a graded-index multimode first optical fiber attached to an end thereof, said first optical fiber having an unattached end;

a first reflective member, said first reflective member being spaced by a gap from said first unattached end of said first optical fiber, said first reflective member comprising a second unattached end of a graded-index multimode second optical fiber, an attached end of which is attached to an end of a second single-mode optical fiber; wherein said predetermined lengths of graded-index first and second optical fiber are fused to said first and second single mode optical fibers, respectively.

2. The optical sensor of claim 1 further comprising an alignment member comprising a length of hollow tubing.

3. The optical sensor of claim 2 wherein said first and second single mode optical fibers are disposed in said alignment member.

4. The optical sensor of claim 3, wherein said first and second single mode fibers are disposed in said alignment member by means of fusion welds.

5. The optical sensor of claim 2 wherein a sealant is applied to the region where said first and second single mode optical fibers enter said alignment member, such that said sealant provides a continuous transition between an outer dimension of said alignment member and outer dimensions of said first and second optical fibers.

6. The optical sensor of claim 5, wherein said sealant is a high temperature adhesive.

7. The optical sensor of claim 5 wherein said alignment member, said sealant and portions of said first and second single mode optical fibers adjacent to said alignment member are provided with a layer of coating material.

8. An optical sensor with read-out system comprising:

an optical sensor comprising first and second optical paths differing in length by a predetermined distance, said optical sensor providing an optical signal output at a first wavelength responsive to an environment sensed by said optical sensor;

an optical source for generating an optical source output at a second wavelength differing from said first wavelength;

third and fourth optical paths differing in length by a distance substantially equal to said predetermined distance, said optical signal output and said optical source output coupled to said third and fourth optical paths such that a first portion of said optical signal output and a first portion of said optical source output comprise a first optical beam traversing said third optical path and such that a second portion of said optical signal output and a second portion of said optical source output comprise a second optical beam traversing said fourth optical path;

a modulator for modulating the phase of at least one of said first and second optical beams; and a controller for sensing a first change in phase relationship between said first and second optical beams at said first wavelength, for sensing a second change in phase relationship between said first and second optical beams at said second wavelength, and for providing a signal to said modulator based on a difference between said first and second changes in phase relationship, said controller returning said phase relationship between said first and second optical beams to a predetermined phase relationship independent of temperature and vibration effects in said read-out system.

9. The optical sensor with readout of claim 8, wherein said second wavelength is provided by a laser and said first wavelength is provided by a light emitting diode.

10. The optical sensor of claim 9, wherein said laser is a 1.55 μm laser and said light emitting diode is a 1.3 μm light emitting diode.

11. The optical sensor with read-out system of claim 8, wherein said optical sensor comprises an optical source, a first optical coupler, and a second optical coupler, said optical beam from said optical source being split by said first coupler, transmitted along said first and second optical paths, and recombined by said second coupler to provide said optical signal output.

12. The optical sensor with read-out system of claim 8, wherein said optical sensor comprises an optical source, a first optical coupler, and first and second reflectors, said optical beam from said optical source being split by said first coupler, transmitted along said first and second optical paths, reflected along said first and second optical paths by said first and second reflectors, and recombined by said first coupler to provide said optical signal output.

13. The optical sensor with read-out system of claim 8, wherein said optical sensor comprises an optical source, a first reflector and a second reflector, a first portion of an optical beam from said optical source being transmitted along said first optical path and reflected by said first reflector along said first optical path, a second portion of said optical beam from said optical source being transmitted along said second optical path and reflected by said second reflector along said second optical path, said second reflector disposed at a greater distance from said optical source than said first reflector, said first and second optical paths being co-linear over the length of said first optical path and said reflected first and second portions of said optical beam recombining to provide said optical signal output.

14. The optical sensor with read-out system of claim 8, wherein said first optical path comprises an optical fiber and said modulator comprises a cylindrical piezo-electric element that varies in diameter as a function of said signal from said controller, said optical fiber being wrapped around said cylindrical piezo-electric element such that said optical fiber changes in length as said cylindrical piezo-electric element varies in diameter.

15. The optical sensor with read-out system of claim 8, wherein said change in environment results in a change in said predetermined distance.

16. A method for linearizing an optical signal output at a first wavelength responsive to an environment sensed by an optical sensor comprising first and second optical paths differing in length by a predetermined distance, said method comprising the steps of:

coupling said optical signal output of said optical sensor at said first wavelength and an optical source output from an optical source operating at a second wavelength different from said first wavelength to third and fourth optical paths such that a first portion of said optical signal output and a first portion of said optical source output comprise a first optical beam traversing said third optical path and such that a second portion of said optical signal output and a second portion of said optical source output comprise a second optical beam traversing said fourth optical path, said third and fourth optical paths differing in length by a distance substantially equal to said predetermined distance;

sensing a first change in phase relationship between said first and second optical beams at said first wavelength and a second change in phase relationship between said first and second optical beams at said second wavelength; and modulating the phase of at least one of said first and second optical beams based on a difference between said first and second changes in phase relationship to return said phase relationship between said first and second optical beams to a predetermined phase relationship independent of temperature and vibration effects in said read-out system.

17. The method of claim 16, wherein the step of modulating the phase of at least one of the first and second optical beams includes the step of providing a voltage to a phase modulator disposed in the optical path of one of said first and second optical beams.

18. The method of claim 17, further comprising the step of measuring the voltage provided to the phase modulator, said voltage being proportional to the change in environment.

19. The method of claim 16, wherein said change in environment causes a change in said predetermined distance.

20. An optical sensor read-out system for use in connection with an optical sensor comprising first and second optical paths differing in length by a predetermined distance for providing an optical signal output at a first wavelength responsive to an environment sensed by said optical sensor, said optical sensor read-out system comprising:

an optical source for generating an optical source output at a second wavelength differing from said first wavelength;

third and fourth optical paths differing in length by a distance substantially equal to said predetermined distance, said optical signal output and said optical source output coupled to said third and fourth optical paths such that a first portion of said optical signal output and a first portion of said optical source output comprise a first optical beam traversing said third optical path and such that a second portion of said optical signal output and a second portion of said optical source output comprise a second optical beam traversing said fourth optical path;

a modulator for modulating the phase of at least one of said first and second optical beams; and a controller for sensing a first change in phase relationship between said first and second optical beams at said first wavelength, for sensing a second change in phase relationship between said first and second optical beams at said second wavelength, and for providing a signal to said modulator based on a difference between said first and second changes in phase relationship, said controller returning said phase relationship between said first and second optical beams to a predetermined phase relationship independent of temperature and vibration effects in said read-out system.

21. The optical sensor readout system of claim 20, wherein said optical source comprises a laser and said optical sensor comprises a light emitting diode.

22. The optical sensor readout system of claim 20, wherein said optical source comprises a 1.55 μm laser and said optical sensor comprises a 1.3 μm light emitting diode.

23. The optical sensor readout system of claim 20, wherein said optical sensor comprises an optical source, a first optical coupler, and a second optical coupler, said optical beam from said optical source being split by said first coupler, transmitted along said first and second optical paths, and recombined by said second coupler to provide said optical signal output.

24. The optical sensor readout system of claim 20, wherein said optical sensor comprises an optical source, a first optical coupler, and first and second reflectors, said optical beam from said optical source being split by said first coupler, transmitted along said first and second optical paths, reflected along said first and second optical paths by said first and second reflectors, and recombined by said first coupler to provide said optical signal output.

25. The optical sensor readout system of claim 20, wherein said optical sensor comprises an optical source, a first reflector and a second reflector, a first portion of an optical beam from said optical source being transmitted along said first optical path and reflected by said first reflector along said first optical path, a second portion of said optical beam from said optical source being transmitted along said second optical path and reflected by said second reflector along said second optical path, said second reflector disposed at a greater distance from said optical source than said first reflector, said first and second optical paths being co-linear over the length of said first optical path and said reflected first and second portions of said optical beam recombining to provide said optical signal output.

26. The optical sensor readout system of claim 20, wherein said first optical path comprises an optical fiber and said modulator comprises a cylindrical piezo-electric element that varies in diameter as a function of said signal from said controller, said optical fiber being wrapped around said cylindrical piezo-electric element such that said optical fiber changes in length as said cylindrical piezo-electric element varies in diameter.

27. The optical sensor readout system of claim 20, wherein said change in environment results in a change in said predetermined distance.

* * * * *